United States Patent [19]
Olsson

[11] 3,912,246
[45] Oct. 14, 1975

[54] AUTOMATIC STABILIZING SYSTEM
[75] Inventor: Jonses Karl Erik Olsson, Braas, Sweden
[73] Assignee: Lihnell Vagn AB, Braas, Sweden
[22] Filed: Feb. 5, 1974
[21] Appl. No.: 439,838

[30] Foreign Application Priority Data
Feb. 5, 1973 Sweden.............................. 7301538

[52] U.S. Cl.............................................. 267/11 R
[51] Int. Cl.²........................................ B60G 21/06
[58] Field of Search.......... 267/11 A, 11 R; 280/124

[56] References Cited
UNITED STATES PATENTS
| | | | |
|---|---|---|---|
| 2,257,733 | 10/1941 | Wolf................................. | 267/11 A |
| 2,492,990 | 1/1950 | Hanna.............................. | 267/11 A |
| 3,563,566 | 2/1971 | Weber.............................. | 267/11 A |

*Primary Examiner*—James B. Marbert
*Attorney, Agent, or Firm*—Wenderoth; Lind & Ponack

[57] ABSTRACT

An automatic stabilizing system, preferably a stabilizer in such craft as land vehicles as well as mobile earth moving and working machines, or ships. The system has for its object to keep the vehicle or the like in a given position in relation to the direction of action of gravity or the resultant of gravity and other forces of acceleration acting upon the vehicle. The automatic stabilizing system comprises, as means for setting the position of the vehicle, a transmitter and operating means controlled by such transmitter and comprising at least one mass which is adapted, when operated for producing acceleration thereof, to be moved from a position of balance against spring action. The transmitter may also comprise several interconnected masses movable each in one plane and acting upon the operating means.

10 Claims, 8 Drawing Figures

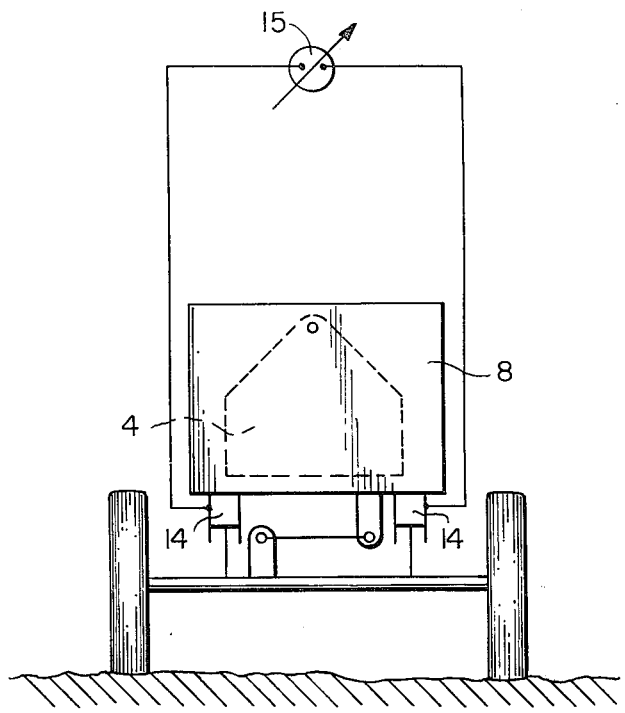
FIG. 5
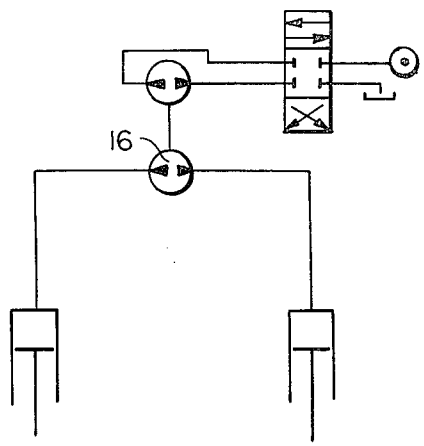
FIG. 6
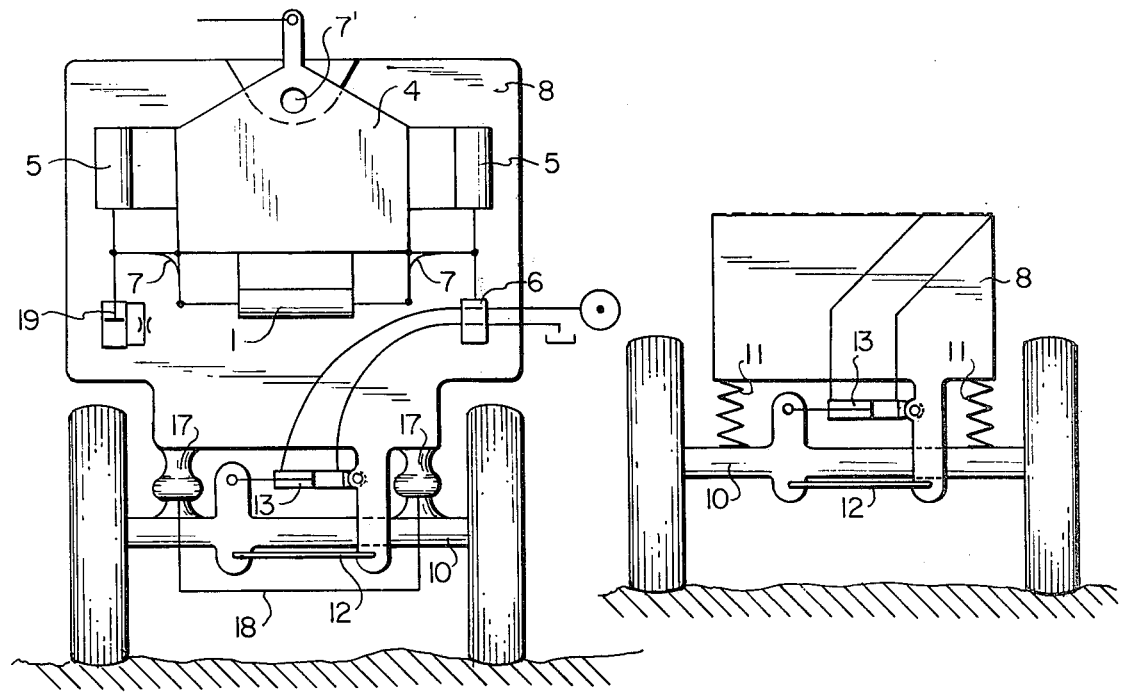
FIG. 7
FIG. 8

AUTOMATIC STABILIZING SYSTEM

BACKGROUND OF THE INVENTION

This invention relates to automatic stabilizing systems, preferably stabilizers in craft such as land vehicles, as well as mobile earth moving and working machines of different kinds, and ships. The automatic stabilizing system has for its object to keep for instance a vehicle in a given position in relation to the direction of action of gravity or the resultant of gravity and acceleration and retardation dependent forces, such as the centrifugal force in a curve, retardation forces on braking etc.

Previously known systems of this type generally comprise a servo-circuit including acceleration sensing transmitters, optionally an electric amplifying circuit, at least one control valve, and power transmitting means, in general hydraulic cylinders.

To provide a system of rapid and exact function it is essential that all parts of the servo-circuit are quick-acting components and that particularly stabilizing transmitters and the control valve display very small friction and clearances. Moreover, it is important, especially for cross-country vehicles, that the stabilizing transmitter is compensated for angular acceleration that will occur when a shock is transmitted to but one wheel and actuates the valve in a wrong direction. A further advantage is gained if the stabilizing transmitter can deliver so great operating forces to the control valve that the electric amplifying stage can be dispensed with.

It is previously known to use a pendulum as a stabilizing transmitter. However, its characteristic frequency will be undesirably low if a corresponding operating force is derived therefrom. It is also previously known (from U.S. Pat. Nos. 2,048,866, 2,257,773 and 2,492,990) to load a pendulum of this kind with centering springs to permit taking out an adequate operating force. Such a centering pendulum load will, however, counteract a rapid reaction.

Systems having double pendulums, which compensate for unilateral shocks are mentioned in Swedish Pat. No. 224,769. Such systems are disadvantageous in that the double pendulum lowers the characteristic frequency of the single pendulum, which is too low already, without increasing the available operating force.

In the device according to Swedish Pat. No. 341,339 the torsional effect exerted by the moment of sway on a transverse torsion bar mounted in the vehicle, is exploited as a measure of the acceleration of lateral inclination. This system suffers from the drawback that the characteristic frequency of the vehicle sway is lowered because the torsion bar lies in series with the wheel and the hydraulic cylinder. The device disclosed in Swedish Pat. No. 114,499 for the same reason suffers from the same drawback.

SUMMARY OF THE INVENTION

The invention has for its object to provide a system which satisfies the objects mentioned above and which eliminates the drawbacks inherent in the previously known systems.

This can be attained:

By using as stabilizing transmitters elastically suspended masses by which it is possible to realize both a relatively high characteristic frequency and a large operating force;

By connecting together two or more masses so that the transmitter will be compensated for angular acceleration when a shock is exerted on a wheel (by providing this compensation in a suitable way the angular acceleration can also be exploited for a more rapid actuation of the transmitter in a correct direction);

By arranging the suspension of the masses with a minimum of friction and clearance with the aid of elastically deformable elements, such as leaf springs of steel.

In sprung vehicles it is possible to realize an increased characteristic frequency and reduced power requirements by causing a power cylinder to act directly between the sprung and non-sprung masses of the vehicle and in such a way that the cylinder is not actuated by the vehicle weight.

In a non-sprung vehicle in which the superstructure is carried by the subframe by means of hydraulic cylinders on both sides, the power required can be reduced by adjustment of the angle between the respective wheel axle and the superstructure with the aid of a hydraulic pump between the cylinders. Such pump need operate only against the difference between the pressures in the cylinders.

Whether the vehicle is sprung or unsprung, a control possibility is obtained with respect to a central axis of the mass carried on each side by connecting the cylinders on both sides in the way described via a pump system according to the invention.

In a vehicle unit arranged to pivot about an axis and equipped with a stabilizing system according to the invention the driver can set the vehicle into a desired position which is then automatically retained by the system.

BRIEF DESCRIPTION OF THE DRAWINGS

Further features of and advantages gained by the invention will appear from the following description and the accompanying drawings in which:

FIGS. 5 and 6 show an embodiment in which for instance a rotary-type pump controlled by mobile masses is used as power transmitting means;

FIG. 7 shows a complete stabilizing system according to the invention in a vehicle having a fluid spring suspension system comparable with the one shown in FIG. 5;

FIG. 8 shows an arrangement of a sprung vehicle having a rigid wheel axle and a sway-damping fluid cylinder.

DETAILED DESCRIPTION OF THE INVENTION

Figure 1:
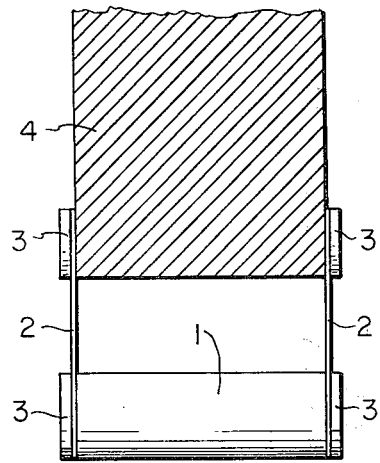
FIG. 1 diagrammatically illustrates the basic principle of the arrangement of a stabilization transmitter in a system according to the invention.

A mass 1 is elastically suspended in a supporting member by means of spring elements in the form of steel bands 2 which are fixedly clamped at the two ends of the mass 1 and to the supporting member 4 by screw connections 3 (FIG. 1).

Figure 2:
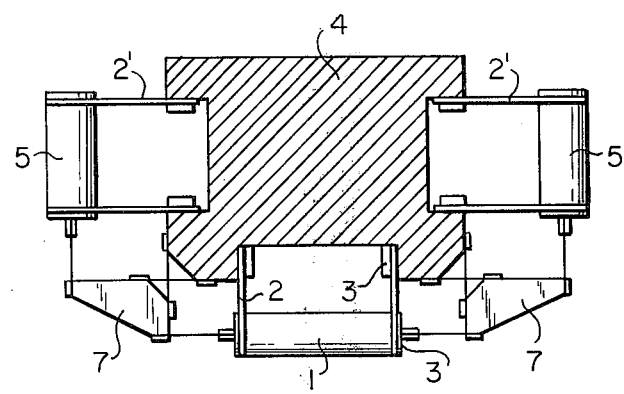
FIG. 2 shows an example of coupling three mobile masses.
Figure 3:
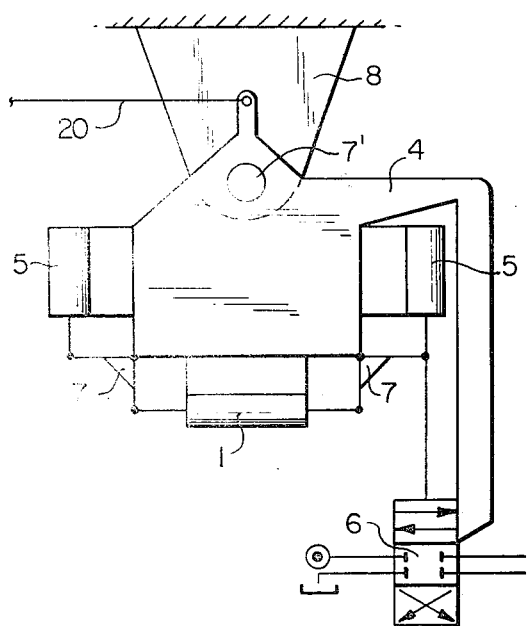
FIG. 3 shows how for instance the driver can actuate the setting of the transmitter.

An embodiment in which several masses are connected together is shown in FIG. 2. Connected to the mass 1 by means of angle joints 7 are two further masses 5 having suspensions 2' of a kind similar to those of the mass 1. FIG. 3 shows an embodiment in which the supporting member 4 for the masses 1 and 5 and a control valve device 6 mounted on the supporting member are pivotally suspended by means of a pivot 7' at a point of the frame of the vehicle 8. The driver can set or adjust the supporting member 4 via an operating means (not shown), such as a hydraulic cylinder, and a power transmitting rod 20.

Figure 4:
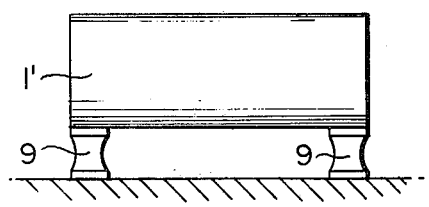
FIG. 4 shows an alternative arrngement of the mobile mass.

The embodiment shown in FIG. 4 illustrates how a mass 1' can be elastically carried by means of rubber elements 9 instead of by means of steel bands.

In FIGS. 5 and 6 the superstructure (not shown in FIG. 6) of a vehicle 8 is carried by hydraulic cylinders 14 interconnected by a reversible and variable fluid pump 15 or, alternatively, a reversible but non-variable fluid pump 16.

FIG. 7 shows a vehicle 8 having a rigid wheel axle 10. Mounted between the vehicle superstructure (sprung mass) and the axle 10 are supporting fluid spring means 17 which are interconnected by a line 18. A transverse stay 12 takes up transverse forces, and a cylinder 13 is used as a stabilizer to counteract the moment of sway.

The cylinder 13 is controlled by a control valve 6 which in its turn is actuated by the masses 1 and 5. The system shown in FIG. 7 includes, in addition to the cylinder 13, a shock absorber 19 between the masses and the supporting member 4, member 4 also carrying the masses, the control valve and being pivotally mounted to and carried by the vehicle superstructure 8.

FIG. 8 shows an alternative embodiment wherein the fluid spring means are replaced by ordinary springs 11.

The function of the stabilizing system according to the present invention will now be described with reference to FIG. 7.

When a force affects the superstructure 8, for instance centrifugal force, the mass 1 is shifted laterally and via the link or pivot means 7' moves the other masses 5 against the effect of the shock absorber 19 and actuates the control valve 6. The valve as a consequence directs the flow of fluid under pressure to the cylinder 13 so as to straighten the superstructure. When the superstructure is straightened and again reaches correct position the masses will return the control valve to its neutral position.

When a sudden vertical shock is exerted upon one wheel, e.g. when meeting a stone or a hole in the ground, the vehicle will tilt about an axis close to the point where the opposite wheel engages the ground. As a result, a single mass would tend to move in the wrong direction by reason of its inertia. Only after a certain time when the acceleration of the angle of inclination generated by the shock approaches zero and the angle of inclination approaches the maximum value, will the mass 1 be moved in the correct direction. A single mass device could thus not give an acceptable function. By including the two lateral masses the unacceptable phenomenon can be counteracted. If the masses 5 are positioned according to the Figures shown, a vertical acceleration of one mass 5, situated close to the axis of tilt, at the shock will be close to zero, whereas the other mass 5 located remote from such axis will be affected by heavy vertical acceleration which, however, is counteracted by the one mass 1.

It is obvious that the vertical shock acceleration can be entirely compensated for at a given distance in the vertical sense between the mass 1 and the point of sway.

Of course, it is also possible to overcompensate for the shock acceleration to cause the system to react more rapidly at a full compensation. Use can be made of the feature that the acceleration lies 180° in advance of the phase increase of the inclination angle, which permits influencing the compensation only by the amount of vertical movement, instead of by the amount of lateral movement. The stabilizing transmitter thus need not be placed in the center of the vehicle. It may be advantageous to position the transmitter at a relatively high level since by such a change of level one will have a smaller change of the compensation degree than when the transmitter is positioned at a low level.

Setting of the vehicle position which is to be maintained automatically, can be effected according to FIG. 3 by manually operable means (valve) by altering the position of the mounting plate 4 in the vehicle 8.

Of course, the direct mechanical connection of the control valve with the masses can be supplemented with or replaced by means (not shown) having an amplifying effect. An electric servo-valve including an amplifying circuit connected to the masses via a potentiometer, can serve as the control valve but a disadvantage of this arrangement is that it reduces the reaction speed of the stabilizing system.

What I claim and desire to secure by Letters Patent is:

1. A stabilizing system for land and water vehicles and preferably intended for use as a stabilizer in vehicles, said system comprising:

a transmitter device means connectable to a first portion of a vehicle for sensing acceleration thereof due to inclination, centrifugal forces or retardation on braking;

control means, and stabilization effecting and power transmitting means, connectable between said first portion and a second portion of a vehicle, responsive to said transmitter device means for countering said acceleration and for stabilizing the position of said first portion with respect to said second portion about an axis of said vehicle; and said transmitter device means comprising at least two masses, said masses being interconnected and movable, against the force of spring action, in at least one parallel plane oriented substantially at right angles to said axis about which stabilization is to be effected.

2. A system as claimed in claim 1, wherein said transmitter device means further comprises a supporting member pivotally suspendable on said first portion of said vehicle about an axis parallel to said axis about which stabilization is to be effected; and wherein said masses are resiliently mounted on said supporting-member.

3. A system as claimed in claim 2, wherein said masses comprise three masses.

4. A system as claimed in claim 2, further comprising elastic means for mounting said masses on said supporting member, said elastic means being substantially rigid in directions at right angles to said at least one parallel plane.

5. A system as claimed in claim 4, wherein said elastic means comprise leaf springs.

6. A system as claimed in claim 4, wherein said elastic means comprise rubber elements.

7. A system as claimed in claim 2, further comprising means to adjust the suspended position of said supporting member with respect to said first portion of said vehicle.

8. A system as claimed in claim 1, wherein said first portion comprises a vehicle body; said second portion comprises a vehicle axle; and said power transmitting means comprises a fluid cylinder directly coupled between said vehicle body and said vehicle axle.

9. A system as claimed in claim 8, wherein said power transmitting means further comprises a reversible fluid pump connected to said fluid cylinder for pumping fluid thereof, said pump being operable by said transmitter device means.

10. A system as claimed in claim 8, further comprising interconnected fluid pressure operated actuating means for supporting said vehicle body on said vehicle axle.

* * * * *